UNITED STATES PATENT OFFICE.

EUGENE HAANEL, OF COBOURG, CANADA.

IMPROVEMENT IN SAFETY-MATCHES.

Specification forming part of Letters Patent No. 169,539, dated November 2, 1875; application filed August 14, 1875.

*To all whom it may concern:*

Be it known that I, EUGENE HAANEL, a citizen of the United States, but at present residing in Cobourg, Ontario, Canada, have invented certain new and useful Improvements in Compositions for Odorless, Non-Poisonous Safety-Matches; and I do hereby declare that the following is a full, clear, and exact description thereof, which will enable others skilled in the art to which it pertains to make and use the same.

My invention relates to that kind of friction matches which are known in the trade as safety-matches, which do not ignite by ordinary friction, but only by friction on a tablet prepared with a composition expressly for that purpose; and the invention consists of such a safety-match made of slips prepared by being soaked in hot paraffine and scorched at their ends, and tipped with an odorless non-poisonous composition, and the combination therewith of a composition tablet, of the ingredients and in the proportions as hereinafter specified and described.

The match composition is made of potassium chlorate, 1.60 part, by weight; sulphide of antimony, 0.30 part, by weight; sesquioxide of iron, 0.35 part, by weight; binoxide of manganese, 0.35 part, by weight; chromate of potassium, 0.05 part, by weight; powdered glass, 0.05 part, by weight. These ingredients, being thoroughly mixed in a powdered state, are made into a paste by the addition of a sufficient quantity of mucilage, which is made of dry gelatine, 1.00 gram; boiling water, .25 centimeter.

The match-slips are prepared for the composition by soaking them in hot paraffine to about one fourth of their length from the ends to be tipped, and slightly scorching the very extremity of those ends, to enable the composition to seize upon the wood and firmly adhere thereto when dry; but this process I do not claim as new. The prepared ends of the slips are dipped in the composition, a small quantity of which adheres to the ends, and is allowed to dry in the light, which, by means of the chromate of potassium, converts the soluble gelatine into insoluble gelatine, by which the matches are effectually protected from the effects of moisture.

The friction-tablet is coated with a composition made of amorphous phosphorus, 1.00 gram; sulphide of antimony, 0.02 gram; powdered glass, 0.25 gram, which ingredients are made into a paint by thoroughly grinding and mixing them with a sufficient quantity of the mucilage hereinbefore described.

What I claim as new, and desire to secure by Letters Patent, is—

1. The friction-match composition made of potassium chlorate, sulphide of antimony, sesquioxide of iron, binoxide of manganese, chromate of potassium, powdered glass, and mucilage, in the proportions and manner substantially as specified.

2. The friction-match made of potassium chlorate, sulphide of antimony, sesquioxide of iron, binoxide of manganese, chromate of potassium, powdered glass, and mucilage, in combination with the friction-tablet made of amorphous phosphorus, sulphide of antimony, powdered glass, and mucilage, in the proportions and in the manner substantially as specified and described.

In testimony that I claim the foregoing as my own invention I affix my signature in presence of two witnesses.

EUGENE HAANEL.

Witnesses:
W. CONIGAL,
GEORGE THOMPSON.